United States Patent [19]

Tredennick et al.

[11] 4,307,445

[45] Dec. 22, 1981

[54] MICROPROGRAMMED CONTROL APPARATUS HAVING A TWO-LEVEL CONTROL STORE FOR DATA PROCESSOR

[75] Inventors: Harry L. Tredennick; Thomas G. Gunter, both of Austin, Tex.

[73] Assignee: Motorola, Inc., Schaumburg, Ill.

[21] Appl. No.: 961,796

[22] Filed: Nov. 17, 1978

[51] Int. Cl.³ .............................................. G06F 9/36
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,599,176 | 8/1971 | Cordero, Jr. et al. | 364/200 |
| 3,636,522 | 1/1972 | Buschmann et al. | 364/200 |
| 3,766,532 | 10/1973 | Liebel, Jr. | 364/200 |
| 3,768,075 | 10/1973 | Reitsma et al. | 364/200 |
| 3,839,705 | 10/1974 | Davis et al. | 364/200 |
| 3,886,523 | 5/1975 | Ferguson et al. | 364/200 |
| 3,930,236 | 12/1975 | Ferguson | 364/200 |
| 3,958,221 | 5/1976 | Serra et al. | 364/200 |
| 3,991,404 | 11/1976 | Brioschi et al. | 364/200 |
| 4,008,462 | 2/1977 | Kanda | 364/200 |
| 4,032,895 | 6/1977 | Lanza et al. | 364/200 |
| 4,037,202 | 7/1977 | Terzain | 364/200 |
| 4,038,643 | 7/1977 | Kim | 364/200 |
| 4,124,893 | 11/1978 | Joyce et al. | 364/200 |
| 4,131,835 | 12/1978 | Lange | 364/200 X |
| 4,131,943 | 12/1978 | Shiraogawa | 364/200 |
| 4,155,120 | 5/1979 | Keefer et al. | 364/200 |
| 4,156,278 | 5/1979 | Wilhite | 364/200 |
| 4,156,279 | 5/1979 | Wilhite | 364/200 |
| 4,168,523 | 9/1979 | Chari et al. | 364/200 |

OTHER PUBLICATIONS

Frieder et al., "An Analysis of Code Density for the two Level Programmable Control of the Nanodata QM-1" in *10th Annual Workshop of Microprogramming,* Oct. 1975, pp. 26-32.
Grasselli, "The Design of Program-Modifiable Microprogrammed Control Units" in *IRE Transactions on Electronic Computers,* EC-11, , No. 6, Jun. 1962, pp. 336-339.
Rosin et al., "An Environment for Research in Microprogramming and Emulation" in *Communications of the ACM,* vol. 15, No. 8, Aug. 1972, pp. 748-760.

*Primary Examiner*—Gareth D. Shaw
*Assistant Examiner*—Eddie P. Chan
*Attorney, Agent, or Firm*—Anthony J. Sarli, Jr.; Vince Ingrassia; Jeffrey Van Myers

[57] ABSTRACT

A microprogrammed control structure for an integrated circuit data processor which employs a two-level control store designated as a micro control store and nano control store. An instruction decoder decodes each macro instruction to be executed by the data processor and causes a series of micro word addresses to be input to the micro control store. In response to such input, the micro control store outputs a corresponding number of nano address words for addressing the nano control store. The nano control store when addressed by the nano address words, outputs a control word to an execution unit for executing the macro instruction.

3 Claims, 7 Drawing Figures

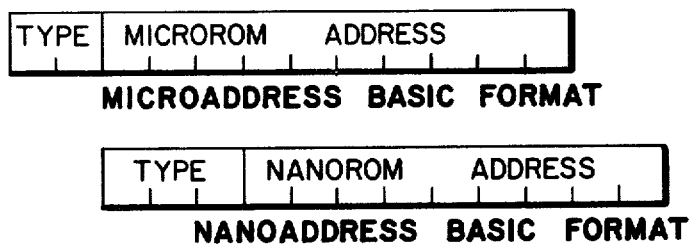
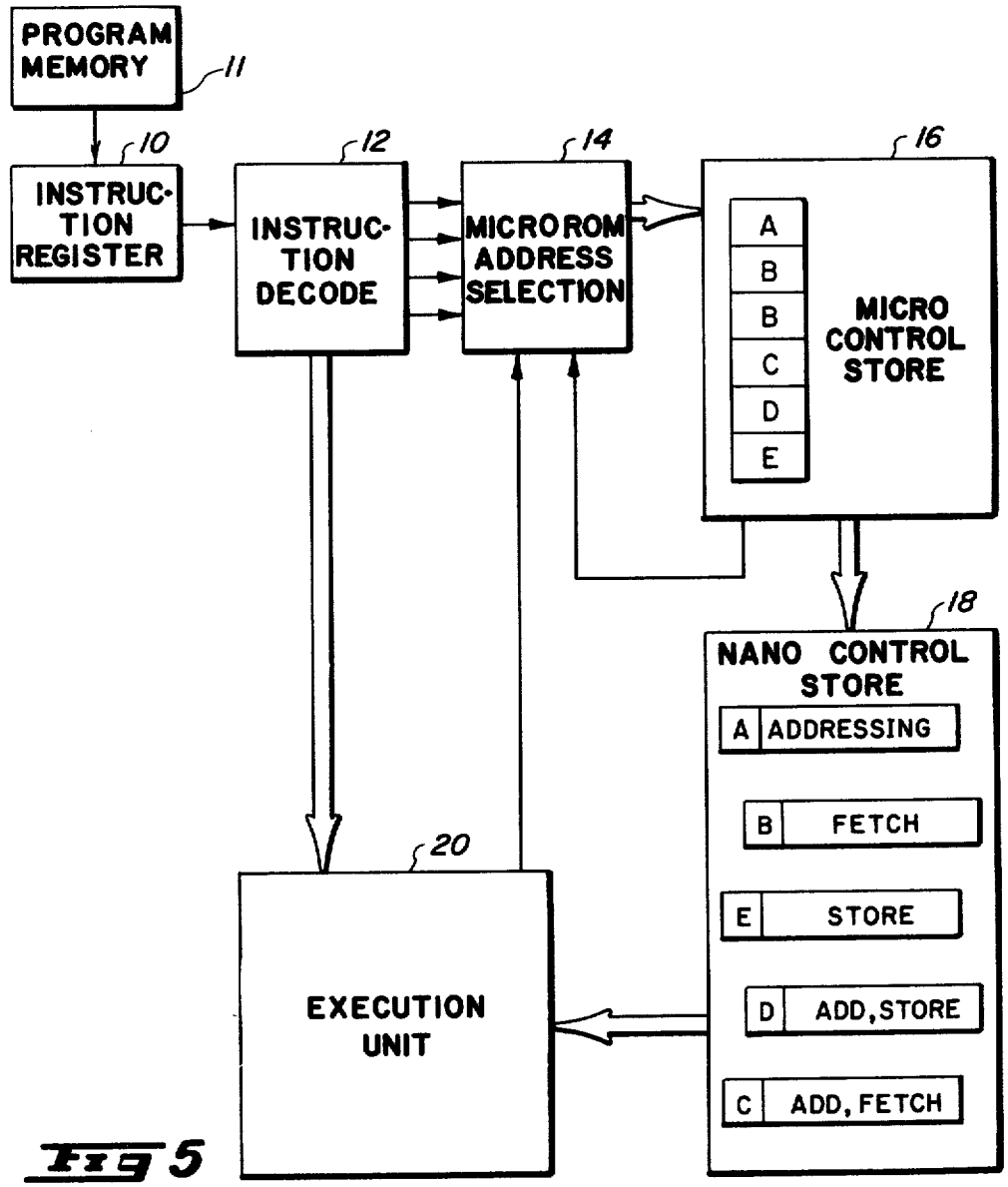

MICROPROGRAMMED CONTROL APPARATUS HAVING A TWO-LEVEL CONTROL STORE FOR DATA PROCESSOR

CROSS REFERENCE TO RELATED APPLICATIONS

1. "Execution Unit For Data Processor Using Segmented Bus Structure", invented by Gunter et al, bearing Ser. No. 961,798, filed on even date herewith, and assigned to the assignee of the present invention.

2. "Multi-Port RAM Structure For Data Processor Registers", invented by McAlister et al, bearing Ser. No. 961,797, now abandoned, filed on even date herewith, and assigned to the assignee of the present invention.

TECHNICAL FIELD

This invention relates generally to data processors and more particularly to a large scale integration, single-chip data processor including a control unit which has a two level microprogrammed structure.

BACKGROUND ART

The field of single-chip, large scale integration (LSI) microprocessors is advancing at an incredible rate. Progress in the underlying semiconductor technology, MOS, is driving the advance. Every two years, circuit densities are improving by a factor of two, circuit speeds are increasing by a factor of two, and at the same time speed-power products are decreasing by a factor of four. Finally, yield enhancement techniques are driving down production costs and hence product prices, thereby increasing demand and opening up new applications and markets.

One effect of this progress in semiconductor technology is advancement in LSI microprocessors. The latest generation, currently being introduced by several companies, is an order of magnitude more powerful than the previous generation, the 8-bit microprocessors of three or four years ago. The new microprocessors have 16-bit data paths and arithmetic capability, and they directly address multiple-megabyte memories. In terms of functional capability and speed, they will outperform all but the high end models of current 16-bit minicomputers.

LSI microprocessor design is now at the stage where better implementation techniques are required in order to control complexity and meet tight design schedules. One technique for achieving these goals is to use microprogramming for controlling the processor. Most of the traditionally claimed benefits of microprogramming, for example, regularity (to decrease complexity), flexibility (to ease design changes), and reduced design costs, apply to the implementation problems for current LSI microprocessor design. Among the constraints which LSI technology imposes on processor implementation are circuit size, circuit speed, interconnection complexity, and package pin count.

There is a fairly constant limit on the size of LSI integrated circuit chips which can be economically produced. Although circuit densities tend to improve over time, the number of gates which can be put on a chip is limited at any given time. Thus a major constraint is to design a data processor which may be implemented within the fixed maximum number of gates.

Another constraint in the implementation of LSI data processors is circuit speed, which is limited primarily by the power dissipation limits of the semiconductor package in which the LSI circuit is mounted. The large speed gap between emitter-coupled logic (ECL) and core memory associated with large computer systems is not applicable to microprocessor applications, where often the processor technology and the main memory technology are the same.

With regard to interconnection complexity, internal interconnections on an LSI circuit often require as much chip area as do the logic gates which they connect. Furthermore, LSI circuit layout considerations often restrict the ability to route a signal generated in one section of the chip to another section of the chip. In some instances, it is more practical to duplicate functions on various sections of the chip than to provide connection to a single centralized function. Another consideration with regard to LSI circuit technology is that regular structures, such as ROM arrays, can be packed much more tightly than random logic.

Semiconductor packaging technology is also a constraint in that it places limits on the number of pin connections which an LSI chip may have to interface to the outside world. The pin-out limitation can be overcome by time multiplexing pin use, but the resulting slow-down in circuit performance is usually not acceptable.

Finally customer demand and intense competition among semiconductor manufacturers often dictate that LSI data processors be designed according to tight time schedules. A control structure which reduces the design time for LSI data processors will be greatly appreciated by those skilled in the art. Furthermore, LSI data processors are often designed initially to be enhanced with new instructions in future versions of the data processor. Alternatively, some LSI data processors may be designed with enough flexibility so as to allow particular users to specify a set of instructions adapted to their needs. It will be appreciated by those skilled in the art that a control structure which simplifies modifications of and additions to a basic instruction set for a data processor is a significant improvement over the prior art.

BRIEF SUMMARY OF THE INVENTION

It is an object of the present invention to reduce the time required to design an LSI data processor.

It is also an object of the present invention to reduce the circuit complexity and simplify the layout of an LSI data processor.

It is a further object of the present invention to provide an LSI data processor which provides an instruction set which may be easily modified or expanded.

These and other objects of the present invention are accomplished by providing an integrated circuit data processor which includes an instruction register for storing an instruction word, an address selection circuit for generating a first address word, a first control memory for receiving the first address word and for providing a second address word, and a second control memory for receiving the second address word and for providing a plurality of control signals for controlling the execution of the instruction stored by the instruction register. In the preferred embodiment of the invention, an instruction decoder is included between the instruction register and the address selection circuit such that a plurality of decoder instruction static signals can bypass the first and second control memory. Also in the preferred embodiment, the first control memory provides a third address word to the address selection circuit such that branching may occur within the first control memory. In the preferred embodiment of the invention, each nano-word is unique.

BRIEF DESCRIPTION OF THE DRAWINGS

FIG. 3 illustrates the basic formats used for addressing the micro-ROM and for addressing the nano-ROM.

FIG. 5 is a block diagram similar to that shown in FIG. 2 but which illustrates the dynamic operation of a two-level control structure for a particular macro instruction.

DETAILED DESCRIPTION OF THE INVENTION

Figure 1:
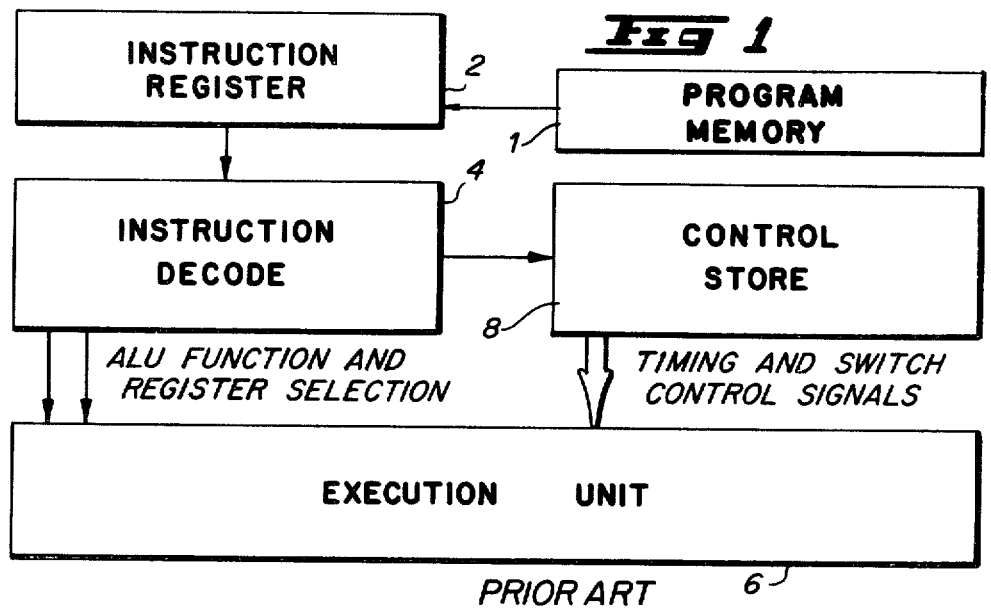
FIG. 1 is a block diagram which illustrates the basic blocks of a microprogrammed data processor.

In FIG. 1, a simplified block diagram of a data processor is shown which employs a microprogrammed control structure to effect execution of instructions. An instruction register 2 stores an instruction which is received from a program memory 1. The stored instruction is output by instruction register 2 to instruction decode block 4. Instruction decode block 4 derives information from the instruction such as a function to be performed by an arithmetic-logic unit within execution unit block 6 as well as the registers which will provide data to the ALU and the registers which will store the result formed by the ALU. Instruction decode block 4 is also coupled to a control store block 8 which provides timing and control signals to execution unit block 6.

The execution of a particular instruction may require several execution unit time periods such that various transfers and functions are performed by execution unit block 6 during each of the execution unit time periods. The timing and control signals provided by control store block 8 ensure that the proper sequence of transfers and operations occur during each of the execution unit time periods.

Figure 2:
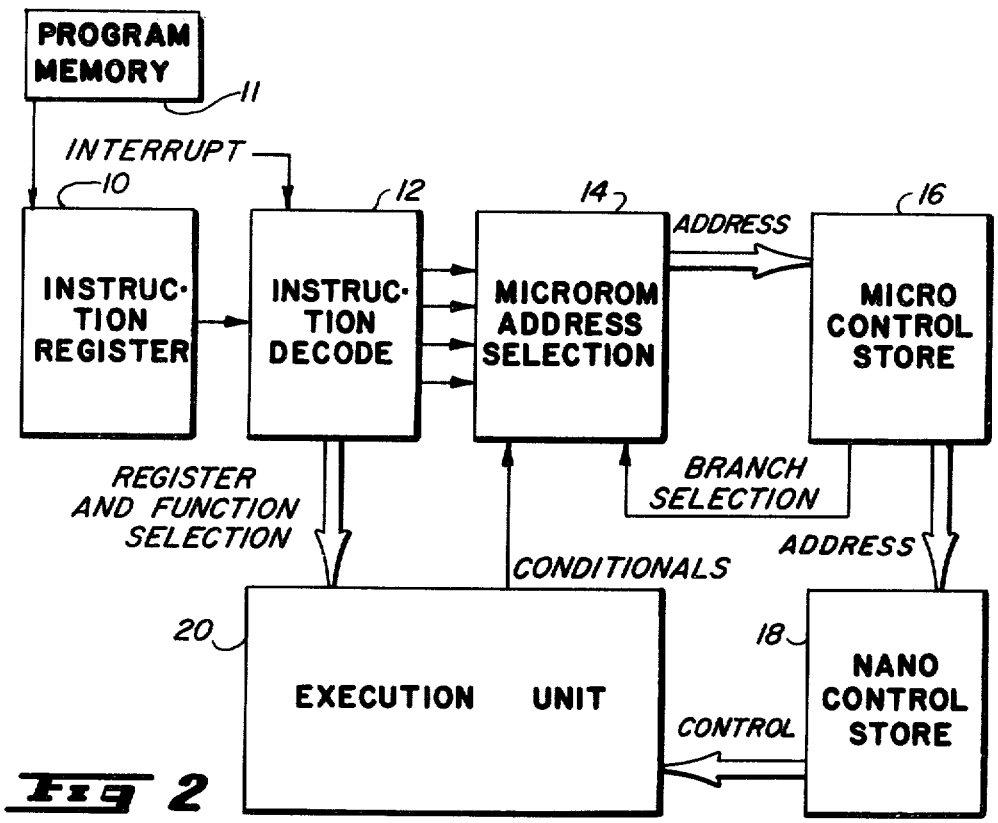
FIG. 2 is a block diagram generally illustrating a two level control store structure for a data processor according to the present invention.

In FIG. 2, a block diagram is shown of the control structure used within a data processor according to a preferred embodiment of the present invention. Instruction register 10 receives a macro instruction from a program memory 11 and stores this instruction. The instruction is decoded by INSTRUCTION DECODE block 12 which performs several functions. First, decode block 12 extracts from the instruction information which is static over the time period during which an instruction is being executed. Examples of instruction static information are source and destination registers, ALU operation (addition, subtraction, multiplication, exclusive-OR), and immediate values contained within the instruction word such as address displacements and data constants. These decoded output signals are indicated in FIG. 2 by an output arrow labeled REGISTER AND FUNCTION SELECTION. Secondly, instruction decode block 12 provides a plurality of micro-ROM address fields to MICRO-ROM ADDRESS SELECTION block 14. Instruction decode block 12 also receives an interrupt input, and block 12 may provide an additional micro-ROM address field to block 14 for initiating an interrupt routine after the execution of a current instruction has been completed.

MICRO-ROM ADDRESS SELECTION block 14 includes logic circuitry and multiplexing circuitry for generating a micro-ROM address which is transmitted to MICRO CONTROL STORE block 16. MICRO CONTROL STORE block 16 is responsive to this address for selecting a particular micro-word stored within block 16. The selected micro-word is transmitted as a nano-address to NANO CONTROL STORE 18 for addressing a particular nano word stored within block 18. The selected nano word is transmitted to execution unit 20 for supplying the control signals required for executing a particular instruction. An execution unit suitable for use in the instant invention is disclosed in U.S. patent application Ser. No. 961,798, Gunter, et al, filed Nov. 17, 1978.

In FIG. 2, it will be noted that MICRO CONTROL STORE block 16 also provides an output labeled BRANCH SELECTION to MICRO-ROM ADDRESS SELECTION block 14. Thus, the current micro-ROM address output by block 14 may be dependent upon the micro word addressed during the immediately preceding cycle. It will also be noted that execution unit 20 is coupled to MICRO-ROM ADDRESS SELECTION block 14 by a line labeled CONDITIONALS. Execution unit 20 stores various condition code flags which are set or reset depending upon the status of ALU operations such as positive/negative result, zero result, overflow, and carry-out. Thus the MICRO-ROM ADDRESS SELECTION block 14 is responsive to the status flags in execution unit 20 for determining such things as whether or not a conditional branch instruction will be implemented by the data processor. For example, a branch on zero macro instruction uses the zero result status flag to determine the sequence of micro instruction to be executed in order to generate the address of the next macro instruction.

Shown in FIG. 3 are blocks which illustrate the format of the micro address and the format of the nano address output by the micro ROM. The micro-ROM address is a 10 bit field which can address up to 1024 micro words stored in the micro control store. The 2-bit TYPE field shown in the micro address format corresponds to the basic branch type of the macro instruction (i.e., direct, conditional, functional). Direct and conditional branches refer to branches in the main program, while functional branches refer to instructions which require that the address of the operand be calculated and the operand fetched before the instruction can be executed. The nano address output by the micro control store includes a 3-bit TYPE field which indicates the type of nano word which is being addressed, and a 9 bit field which is the address input to the nano control store. The 3-bit TYPE field is used to determine the selection of the next micro address. When fully decoded, this 3-bit TYPE field can select one of up to eight possible sources for the next micro ROM address.

Figure 4:
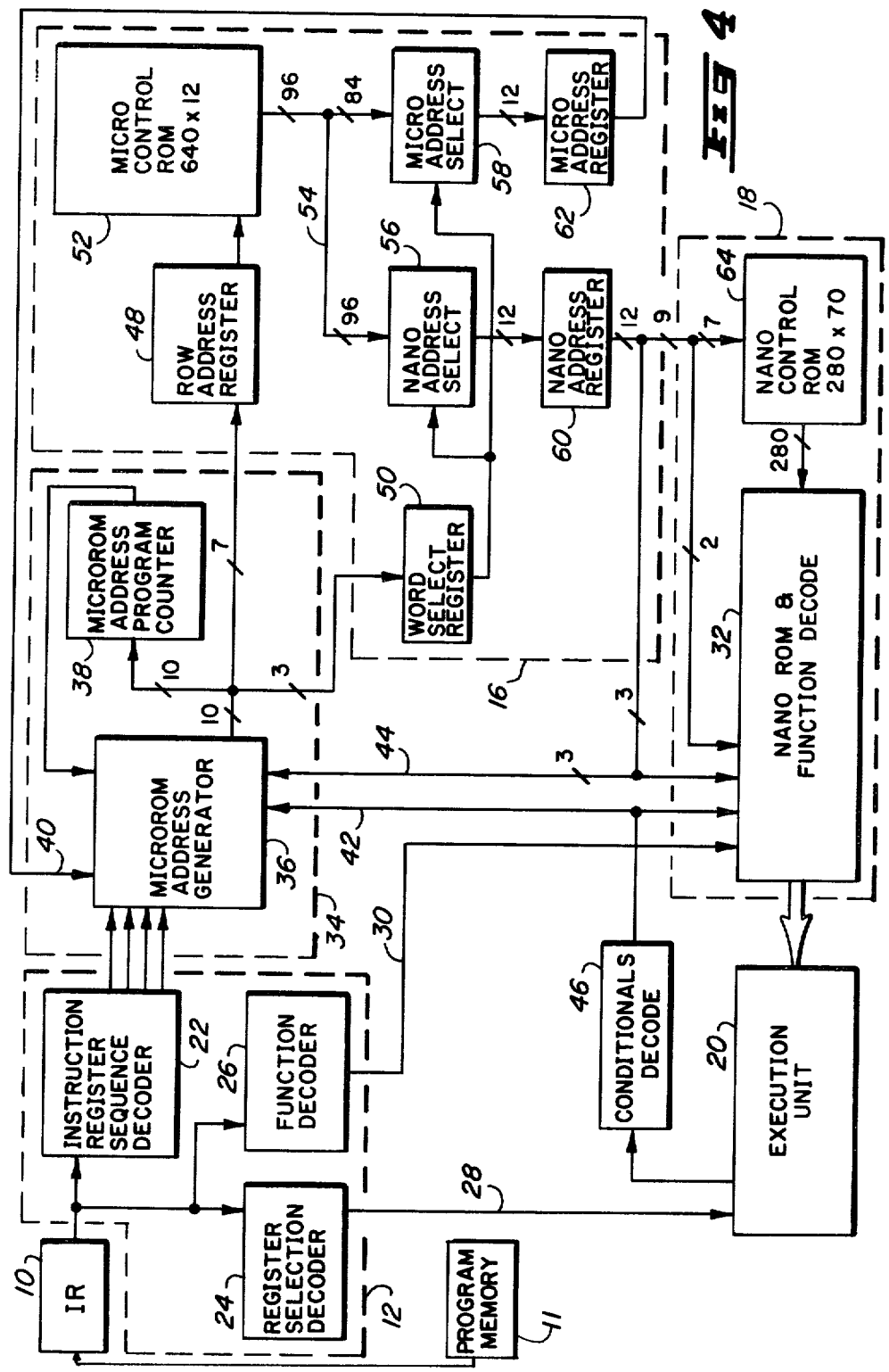
FIG. 4 is a more detailed block diagram of the structure described in FIG. 2.

In FIG. 4 a block diagram is shown which illustrates the implementation of the structure shown in FIG. 2 in greater detail. As before, instruction register 10 is coupled to instruction decode block 12 shown in dashed lines. Within dashed block 12, the instruction is received by an instruction register sequence decoder 22, a register selection 24, and a function decoder 26. Register selection decoder 24 decodes static information relating to which registers will be read or written during the execution of the current instruction. Function decoder 26 decodes static information relating to the operations to be performed during the execution of the present instruction. The output of register selection decoder 24 is coupled directly to the execution unit 20 by a plurality of lines designated 28. The output of function decoder 26 is coupled to a nano ROM and function decode block 32 by a plurality of lines designated 30. The function of block 32 will be described hereinafter.

Instruction register sequence decoder 22 provides a plurality of 10-bit address fields to the micro-ROM address selection dashed block 34. Micro-ROM address selection block 34 includes a micro-ROM address generator 36 and a micro-ROM program counter 38. Micro-ROM program counter 38 includes a latch and an incrementor for latching the current micro-ROM address and for providing an incremented micro-ROM address. The incremented micro-ROM address may be selected as the next micro-ROM address when no branch is to occur within the micro-ROM. Another possible source of the next micro-ROM address is coupled to micro-ROM address generator 36 by lines designated 40. Lines 40 will be referred to hereinafter.

Also received by micro-ROM address generator 36 are two groups of control lines designated by 42 and 44. The group of control lines designated 42 are generated by conditionals decode block 46 which receives status flags from execution unit 20 and which provides a decoded output representative of the status flags. Thus micro-ROM address generator 36 may use the group of control lines designated 42 to select, and possibly modify, an address field supply by one of the sources of the next micro-ROM address. The group of control signals designated 44 also determines which address field is selected as the next micro-ROM address, and these control signals correspond to the 3-bit TYPE bit field shown in FIG. 3.

Micro-ROM address generator 36 outputs a 10 bit micro-ROM address (as shown in FIG. 3) to micro control store 16, shown as a dashed block. Block 16 includes a row address register 48 which receives 7 of the 10 bits in the micro-ROM address, and a word select register 50 which receives the other 3 bits of the micro-ROM address. In the preferred embodiment, the micro control ROM includes 640 12-bit micro words organized as 80 96-bit words. Row address register 48 selects one of 80 rows in micro control ROM 52, which then outputs a 96-bit word on lines designated 54. The 96-bit field is received by nano address select block 56, while 84 bits of the 96-bit field are received by micro address select block 58.

The nano address select block 56 and micro address select block 58 each provide a multiplexing function for selecting one 12-bit field as an output. Word select register 50 determines which 12-bit field is selected by blocks 56 and 58. Generally, block 58 selects the 12-bit field which immediately follows the 12-bit field selected by block 56, and this is the reason that the input to block 58 omits one of the 12 bit fields received by block 56. The 12-bit field selected by the micro address selection block 58 may correspond to a micro address if a branch is to be performed in the micro-ROM. Alternatively the 12-bit field selected by block 58 may merely correspond to the next nano address word. This may be determined by the 3 bit TYPE field in the nano word selected by block 56.

Nano address selection block 56 is coupled to a nano address register 60 which latches the 12-bit field selected by block 56. Similarly micro address register 62 latches the 12-bit field selected by block 58. The nano address register 60 outputs a 12-bit field as is shown in FIG. 3. Three of the 12 bits are coupled to the lines designated 44 for transmitting the type of nano word to micro-ROM address generator 36. For example, if a branch is to occur in the micro-ROM, then the three bit TYPE field specifies to micro-ROM address generator 36 that the source of the next micro-ROM address is the output of micro address register 62 coupled to lines designated 40. If this branch is dependent upon the status flags, then the control lines designated 42 will determine whether or not the output of the micro address register 62 will be used as the next micro-ROM address.

The other nine bits of the nano address register output are coupled to the nano control store designated by dashed block 18. Within block 18 is nano ROM 64 which, in the preferred embodiment, is organized as 70 rows each containing 280-bit fields. Of the nine bits in the nano address, 7 bits are used to select one of the 70 rows. It will be realized that 7 bits allows for the expansion of nano ROM 64 up to and including 128 280-bit fields. The 280-bit field corresponding to the selected row in nano ROM 64 is output to NANO ROM AND FUNCTION DECODE block 32. Block 32 includes a four to one multiplexer for selecting a 70-bit field from among the 280-bit field output by nano ROM 64. The multiplexer within block 32 is responsive to the other two bits of the nine bit nano address, to the output of conditional decode block 46, and to control lines designated 44 (TYPE field in nano address in FIG. 3) for determining which of the 70-bit fields is to be selected.

Also contained within block 32 is a limited amount of logic for decoding the selected 70-bit field output by the multiplexer in order to generate fully decoded control signals for controlling execution unit 20. Among this logic is an array consisting of 15 rows and 5 columns. The appropriate row is selected by the output of function decoder block 26, and this row selection remains static over the entire execution of the instruction. The column selection for the described array is performed by a 3-bit field among the 70 bits selected by the multiplexer within block 32. Column selection by the nano ROM allows for the proper sequencing of the static signals and also allows the static signals to be made conditional depending on the status of the condition flags. An example of the operation of the described array is a multiply instruction which uses the functions of logical AND, addition, substraction, and end-around shift. One of the 15 rows in the described array corresponds to a multiply operation, and each column in this row corresponds to one of the functions used to perform the multiply instruction. The nano ROM chooses the proper column at the proper time so that the sequence of functions performed by the execution unit accomplishes the multiply instruction.

Thus a two-level control store structure has been described for an integrated circuit data processor wherein each macro instruction received by the instruction register is emulated by a sequence of micro instructions. The micro instructions are narrow, consisting primarily of pointers to nano instructions. Micro instructions also contain information about branching in the micro sequence. The nano instructions are wide, providing fairly direct, decoded control of the execution unit. Nano instructions can be placed randomly in the nano control store since no sequential accesses to nano instruction are required. Also only one copy of each unique nano instruction need be stored in the nano control store, no matter how many times it is referred to by various micro instructions.

The Appendix contains an analytic treatment of a single level control and a two-level control structure. A derivation of the potential savings in control store space is given.

It should be appreciated that the control structure according to the present invention is designed so that each micro word specifies a single nano instruction rather than a sequence of nano instructions. Sequences of nano instructions are not used for two reasons. First most micro sequences tend to be very short (1, 2, or 3 micro instructions), such that sequential nano instructions cannot be used to advantage. Secondly, unless some facility for nano branches is implemented, multiple copies of some nano instructions must be kept in the nano control store.

Also it should be appreciated by those skilled in the art that by interposing an initial instruction decoder between the instruction register and the control store, the required micro control store size may be reduced. The basic idea is to extract from the macro instruction word all information which is macro instruction static; that is, information which does not depend on timing during the instruction execution for its usefulness. Signals which are not timing dependent bypass the control store and act directly on the execution unit.

In a typical micro control implementation, the instruction decoder provides a starting address to the control store. The control store generates a sequence of control signals for the execution unit and its own next state information. Branching is accomplished using feedback from the execution unit to alter the next state information in the control store. At the end of execution of the macro instruction, the control store causes loading of the next macro instruction into the instruction register and transfers next state control to the instruction decode unit.

The dynamic operation of the data processor using the two-level control store structure according to the present invention is illustrated in FIG. 5 for a register-to-memory add instruction having an indexed address. The instruction decode block provides the starting address for a single macro instruction routine. The micro control store provides a sequence of addresses into the nano control store. The nano control store contains an arbitrarily ordered set of unduplicated machine state control words. The first micro word (A) points to a nano word stored at address A which causes the execution unit to compute the address of the memory location which contains the operand to be added to an internal register. The next micro word (B) points to a nano word stored at address B which causes the execution unit to output the computed address for fetching the least significant 16 bits of the operand stored in memory. The following micro word (B) again points to the nano word stored at address B for fetching the most significant 16 bits of the operand stored in memory. The next micro word (C) performs an addition on the least significant 16 bits of the two operands and also fetches the next macro instruction. The next micro word (D) points to a nano word stored at address D which causes the execution unit to add the most significant 16 bits of the two operands while storing the result of the least significant 16 bit addition in memory. Finally, the last micro word (E) points to a nano word stored at address E which causes the most significant 16 bits of the result to be stored in memory.

It should be appreciated by those skilled in the art that a novel two-level control structure has been described for controlling the execution of instructions within an integrated circuit data processor. While the invention has been described with reference to a preferred embodiment, the description is for illustrative purposes only and is not to be construed as limiting the scope of the invention. Various modifications and changes may occur to those skilled in the art without departing from the true spirit and scope of the invention as defined in the appended claims.

APPENDIX

Figure 6:
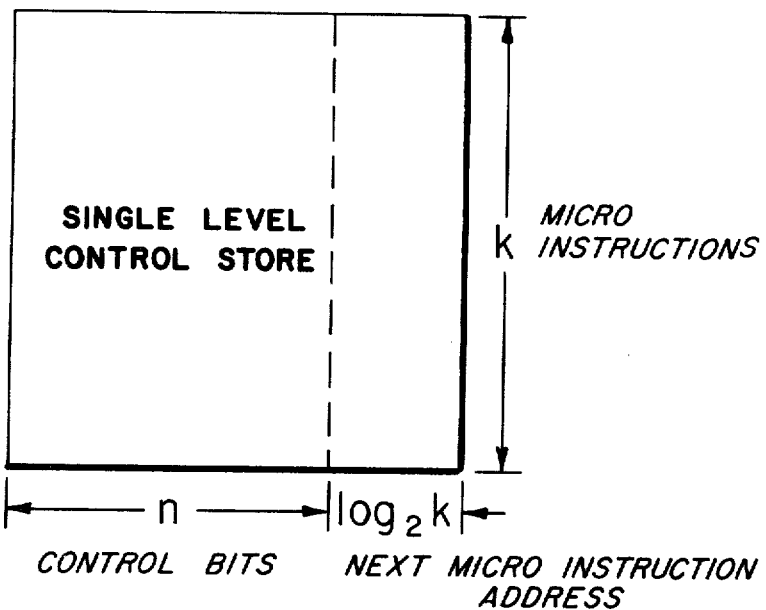
FIG. 6 and FIG. 7 are referred to within the Appendix for comparing a single level control store to a two level control store.

FIG. 6 illustrates a simplified model of a single-level control store. Within the control store there are k micro instructions, where k is equal to the total number of control states required to implement all of the macro instructions. Each of the k micro instructions contains a control state of n bits and a next micro instruction address having $\log_2 k$ bits, where n is the number of individually-controlled switches in an execution unit, i.e., the width of the control word. Thus the total size of the single level control store is the following:

$$S_1 = k \cdot (n + (\log_2 k))$$

Figure 7:
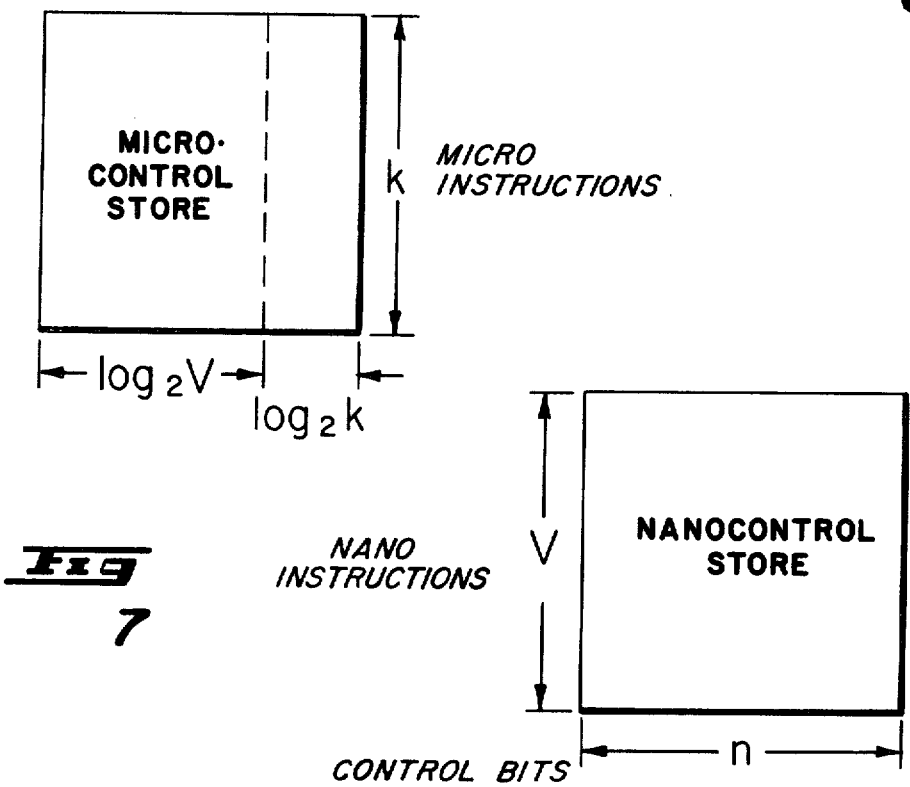

FIG. 7 is a simplified model of a two-level control store which has a micro control store of k micro instructions each having a nano address of $\log_2 v$ bits and having a next micro instruction address of $\log_2 k$ bits. The nano control store has v nano instructions, each containing a control state having n bits. The value for v is equal to the total number of control states required to implement all of the macro instructions times the proportion of unique control states to the total number of control states. Thus the total size of the two-level control store is the following:

$$S_2 = k \cdot ((\log_2 v) + (\log_2 k)) + nv$$

Based upon the expressions for single-level and two-level control stores, it may be shown that a two-level control store requires less control store bits than a single control store when $S_2$ is less than $S_1$, which simplifies to the following expression:

$$k < (1/x) \cdot 2^{n(1-x)},$$

where x equals the proportion of unique control states to the total number of control states.

What is claimed is:

1. A data processor having a two-level microprogrammed control structure, said data processor comprising:
   (a) an instruction register for storing, sequentially, a plurality of macroinstructions comprising a program being executed by said data processor;
   (b) decoding means coupled to the instruction register, and responsive to the contents of said instruction register representing a field of a macroinstruction, for providing first and second outputs, said first outputs being coupled to an execution unit of said data processor for providing first control information thereto, and said second outputs for providing a plurality of sets of address data to a control structure for providing second control information to said execution unit; said control structure comprising:

(1.) an address generator coupled to the decoding means and responsive to one of said sets of address data for generating a first address and address select signals, (2) first control store coupled to the address generator and responsive to said first address for accessing a location of the first control store as determined by the first address and for simultaneously generating a plurality of second addresses representing the contents of the accessed location of the first control store, (3.) selection means responsive to said address select signals for selecting one of said second addresses, and (4.) second control store coupled through said selection means to the first control store and to the address generator, the second control store responsive to a selected one of said second addresses as provided by the first control store and as selected by said selection means, for accessing a location of the second control store as determined by the selected one of the second addresses and for generating said second control information representing the contents of the accessed location of the second control store to said execution unit.

2. A data processor as set forth in claim 1 wherein said first control information is static throughout the execution of a macroinstruction and said second control information is variable during execution of a macroinstruction.

3. A data processor as set forth in claim 1 further comprising:

(a) means for decoding said second control information and said first control information before providing said first and second control information to said execution unit.

* * * * *